United States Patent [19]
McKay

[11] Patent Number: 5,106,168
[45] Date of Patent: Apr. 21, 1992

[54] EMPTY-LOAD CHANGEOVER VALVE FOR RAILWAY CAR

[75] Inventor: Albert A. McKay, Stoney Creek, Canada

[73] Assignee: Westinghouse Air Brake Company, Wilmerding, Pa.

[21] Appl. No.: 550,915

[22] Filed: Jul. 11, 1990

[51] Int. Cl.$^5$ ............................................. B60T 8/18
[52] U.S. Cl. .................................. 303/22.2; 303/22.7; 188/195
[58] Field of Search .................. 303/22.2, 22.3, 22.7, 303/9.69; 188/195

[56] References Cited

U.S. PATENT DOCUMENTS

| | | | |
|---|---|---|---|
| 2,068,342 | 1/1937 | McClure | 303/22.2 |
| 3,376,080 | 4/1968 | Kettering et al. | 303/22.6 |
| 3,671,086 | 6/1972 | Scott | 303/22.2 |
| 4,080,005 | 3/1978 | Engle | 303/22.6 |
| 4,235,477 | 11/1980 | Hart | 303/22.6 |
| 4,235,478 | 11/1980 | Billeter | 303/22.2 |
| 4,291,923 | 9/1981 | Billeter | 303/22.2 |
| 4,364,609 | 12/1982 | Wickham | 303/22.2 |
| 4,417,767 | 11/1983 | Billeter | 188/195 |
| 4,583,790 | 4/1986 | Scott | 303/22.2 |
| 4,801,179 | 1/1989 | Hintner | 188/195 |
| 5,005,915 | 4/1991 | Hart et al. | 303/22.2 |

Primary Examiner—Robert J. Oberleitner
Assistant Examiner—Lee W. Young
Attorney, Agent, or Firm—G. J. Falce

[57] ABSTRACT

An empty/load changeover valve for a railway freight car having a proportioning valve via which the car control valve supplies and releases brake cylinder pressure. The proportioning valve comprises a balance piston having equal opposing pressure areas and a check valve integral therewith, one pressure area of the balance piston being subject to air supplied to the brake cylinder under all conditions of car loading. The opposing pressure area is of the balance piston either pressurized or depressurized depending upon the car load condition to accordingly establish a proportional mode of brake control only under empty conditions of vehicle loading. A release control valve is provided to assure release of the brake cylinder pressure in bypass of the proportioning valve check valve, and a lock-out feature prevents car rock and roll from affecting operation of the proportioning valve under empty conditions of car loading.

11 Claims, 3 Drawing Sheets

EMPTY-LOAD CHANGEOVER VALVE FOR RAILWAY CAR

BACKGROUND OF THE INVENTION

The present invention relates to an empty/load type brake control system for a railway freight car and, more particularly, to an empty/load changeover valve device that employs a proportioning valve to load-adjust the brake cylinder pressure in the empty range of car weight.

Single capacity brake equipment produces a brake shoe force that is independent of car loading, thus making it difficult to achieve desirably higher braking ratios for a loaded car without exceeding an empty car braking ratio sufficient to cause wheel slide. Sliding wheels are undesirable from the standpoint of reduced braking retardation, and slid-flat wheels.

Special brake equipment is therefore necessary to increase the loaded car braking ratio without incurring the consequence of a wheel slide condition when braking an empty car. Such equipment automatically adjusts brake shoe force according to the load condition of the car. These special equipments fall into two primary categories, dual capacity empty/load braking and multiple capacity or continuously variable load braking.

In the dual capacity empty/load equipment, there are just two settings, one for "empty" braking and one for "load" braking, the changeover point between the "empty" and "load" settings being selected at some predetermined car weight, usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi.). Therefore, when making relatively light service brake applications or when making a maximum brake application from a relatively low running pressure (70 psi.), the proportioned brake pressure may be far less than that capable of being supported by the adhesion demand. Accordingly, less than optimum brake efficiency is realized under certain brake conditions with variable load type brake equipment, as well as single capacity equipment, in order to protect against wheel sliding on an empty car under maximum braking conditions.

In known dual capacity brake systems such as disclosed in U.S. Pat. No. 3,671,086, a proportioning valve arrangement is employed to reduce the braking pressure by a fixed ratio during empty car braking. In order to be compatible with the quick service limiting valve requirements for freight brake control valves, which assures that 8 to 12 psi. brake cylinder pressure will be developed from even the lightest service application, the aforementioned system withholds the empty/load sensing function until a predetermined minimum brake cylinder pressure has developed, generally 12 psi. However, since an equalizing volume is required in such proportional type dual capacity systems to maintain proper control valve operation, an inadvertent loss of braking pressure can occur when the empty/load changeover valve sensing function comes into play, due to the existing brake cylinder pressure being able to momentarily backflow into the equalizing volume. This occurs when a light service reduction is made, just sufficient to operate the load sensing valve on empty cars, in which case, the brake cylinder pressure can build up to 12 psi. and then be reduced back to the limiting valve pressure setting on each car, which can be as light as 8 psi. This is caused by the brake cylinder air flowing into the empty/load equalizing volume.

The empty/load valve device disclosed in U.S. Pat. No. 5,005,915 overcomes this problem by providing a backflow check valve integral with the proportioning valve that is oriented to open in the flow direction of brake cylinder supply pressure and to close in the opposite direction corresponding to the exhaust of brake cylinder pressure. Such an arrangement prevents any inadvertent backflow of brake cylinder pressure and consequent loss of braking power, as could otherwise occur when the proportioning of brake cylinder pressure is initiated during a brake application, due to the fact that a previously vented equalizing reservoir is connected to the car control valve in parallel with the brake cylinder at this time.

While this backflow control provided by the proportioning valve check valve is desirable during a brake application, the check valve must be physically opened during brake release to prevent the brake cylinder pressure from being inadvertently trapped. In the aforementioned U.S. patent, a retracting spring acts through the sensing arm actuating piston and empty/load spool valve to open the proportioning valve check valve against the opposing force of brake cylinder pressure acting thereon when the spool valve is shifted to its normal release position during brake release.

Due to the spring force required to unseat the proportioning valve check valve under all conditions of brake pipe pressure, however, the actuating piston would have to be prohibitively large to operate the sensing arm against the retracting spring at the appropriate brake cylinder pressure of approximately 12-20 psi.

Moreover, the possibility of the retracting spring breaking and/or high friction developing in the sensing arm linkage exists, which would result in full brake cylinder pressure becoming trapped during brake release, due to failure to unseat the proportioning valve check valve.

In addition, the aforementioned U.S. Pat. No. 5,005,915 incorporates dual O-ring seals surrounding opposite sides of the respective annular passages of the empty/load spool valve, in order to prevent the car rock and roll from causing the spool valve to inadvertently transition between its empty and load settings, when the car load condition closely corresponds to the selected changeover point of the load sensing arm. In such an arrangement, however, it has been found possible that the sensor arm will pull the spool valve to a neutral position in which the dual O-rings are spaced on opposite sides of the bushing ports with which they control communication. In one aspect of this eventuality, the pressure in the proportioning valve balancing chamber becomes trapped at a value corresponding to the brake cylinder pressure at which the sensing arm is actuated. This trapped pressure coupled with the force of the proportioning spring is insufficient to maintain the proportioning valve open against the braking pressure acting in the opposite direction, when high brake pipe pressures are employed. Consequently, the proportioning valve check valve will be forced closed to initiate proportioning action of the brake cylinder pressure without the sensing arm actually passing through the changeover point from a load condition to an empty condition.

SUMMARY OF THE INVENTION

One object of the present invention is to provide a means of releasing the brake cylinder pressure in bypass of the proportioning valve check valve.

Another object of the invention is to provide an improved means of preventing undesired transition of the empty/load control due to car rock and roll.

In accordance with the foregoing objectives, there is provided for use in a railway vehicle brake control system an empty/load changeover valve device, a brake cylinder, and a brake control valve via which fluid under pressure is connected to the brake cylinder and released therefrom. The changeover valve device includes load sensing means for measuring the distance between the vehicle sprung and unsprung members to provide an empty setting and a load setting of the changeover valve device depending upon this distance being greater or less than a predetermined distance. An inlet passage of the changeover valve device is connected to the control valve and an outlet passage is connected to the brake cylinder. A backflow check valve element of a proportioning valve is engageable with a valve seat in the inlet passage in order to interrupt pressurization of the brake cylinder in a closed position and to permit such pressurization in an open position. A balance piston of the proportioning valve having equal opposing pressure areas is connected to the check valve element, one of the pressure areas being subject to the pressure at the inlet passage. Empty/load valve means pressurizes the opposing pressure area of the balance piston in the load setting of the changeover valve to maintain the check valve element in its open position consistent with a non-proportional mode of operation and depressurizes this pressure area in the empty setting, whereby a fluid pressure force imbalance is established across the balance piston in the direction of closure of the check valve element to initiate a proportional mode of operation.

Release control valve means provides fluid pressure communication between the inlet and outlet passages in bypass of the backflow check valve when the fluid under pressure at said inlet passage is released.

The foregoing objects and other features and advantages of the invention will be more readily understood from the following more detailed explanation when taken in conjunction with the accompanying drawings in which.

DESCRIPTION AND OPERATION

Figure 1:
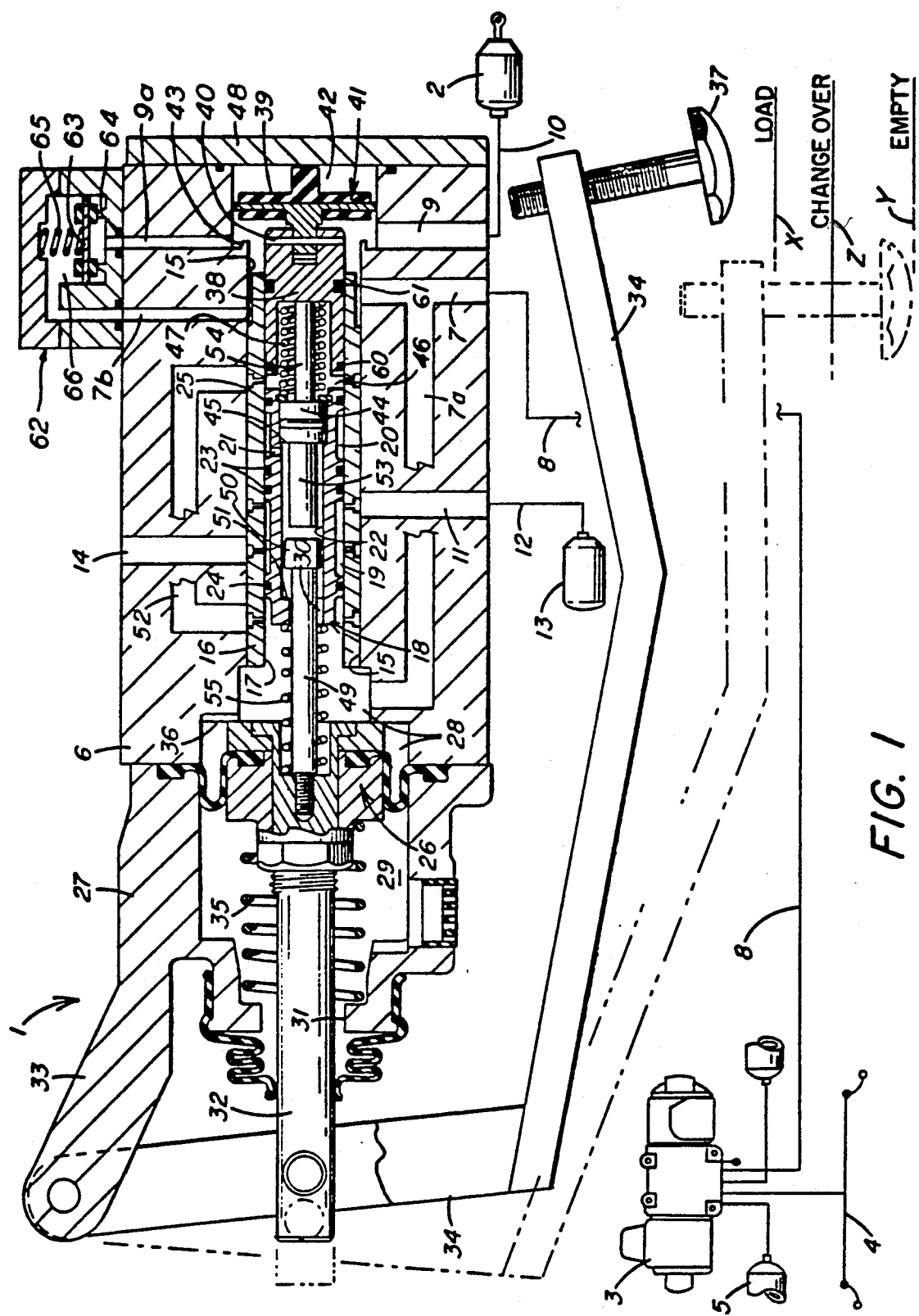
FIG. 1 is a schematic view of an empty/load brake control system showing a preferred embodiment of the changeover valve of the present invention in section.

In accordance with the present invention, there is shown in FIG. 1 an empty/load changeover valve device 1 interposed between a brake cylinder device 2 and a freight brake control valve device 3, such as a conventional ABDW type brake control valve device. As is well known, this control valve device 3 operates on the pressure equalization principle in response to reductions of the air pressure carried in a train brake pipe 4. An auxiliary reservoir 5 is charged to the pressure carried in brake pipe 4 and supplies air to brake cylinder device 2 in response to and in an amount dependent upon the reduction of brake pipe pressure, as controlled by control valve device 3. Pressure equalization exists between the compressed air in brake cylinder 2 and auxiliary reservoir 5 when a full service reduction of the brake pipe pressure is made.

The main body 6 of changeover valve device 1 is provided with an inlet passage 7 that is connected by a brake cylinder supply pipe 8 to control valve device 3, an outlet passage 9 that is connected by a delivery pipe 10 to brake cylinder device 2, a passage 11 that is connected by a pipe 12 to an equalizing reservoir 13, and a vent passage 14 that is open to atmosphere.

Main body 6 further includes a bore 15 in which a bushing 16 is fixed, the respective passages 11 and 14 being connected to a bore 17 of bushing 16 in which a spool valve 18 is axially disposed. Surrounding the periphery of spool valve 18 are annular grooves 19 and 20, groove 20 having a connecting port 21 leading to a stepped bore 22 of spool valve 18. A pair of O-ring seals 23 provide a pressure seal between grooves 19 and 20, while an O-ring seal 24 provides a pressure seal between groove 19 and the left-hand side of spool valve 18, and an O-ring seal 25 provides a pressure seal between groove 20 and the right-hand side of spool valve 18.

A diaphragm type actuating piston 26 is clamped between main body 6 and an end body 27 to form on one side an actuating chamber 28 and on the other side a vent chamber 29. Actuating chamber 28 is communicated with stepped bore 22 of spool valve 18 via an opening 30 in the left-hand end of the spool valve, and with inlet passage 7 via a branch passage 7a.

Projecting through an opening 31 in end body 27 is a push rod 32 of actuating piston 26. An extension 33 of end body 27 pivotally supports a sensor arm 34 to which push rod 32 is connected to effect rotation of the sensor arm in response to operation of the actuating piston against the resistance of a retracting spring 35 in vent chamber 29. In its retracted position, actuating piston 26 is engaged with a stop provided by a flange 36 of main body 6, and an adjusting screw 37 of sensor arm 34 is displaced from an unsprung member, such as a railway car side frame, under all load conditions. Reference line X indicates the position of the car side frame relative to the car body (on which changeover valve device 1 is assumed to be mounted) in a fully loaded condition of car weight. Reference line Y indicates the position of the car side frame relative to the car body in a completely empty condition of car weight. A changeover point Z is selected representing the car weight at which transition occurs between an empty or load condition of car weight.

Aligned axially in bore 17 adjacent the right-hand side of spool valve 18 is a balance piston 38 having a pair of O-ring seals 60, 61 surrounding its periphery. Connected to balance piston 38, as by a roll pin 40, for example, is a backflow check valve 39. Balance piston 38 and check valve 39 each have equal opposing pressure areas and comprise a proportioning valve 41 that may be controlled to operate in either a proportioning mode or in a non-proportioning mode. Check valve 39 includes an annular disc valve element that is guidably disposed in a cavity 42 formed in main body 6 at the right-hand side of bore 15 and into which cavity bore 17 opens. The disc valve element of check valve 39 is arranged to engage and disengage an annular valve seat 43 formed between bore 15 and cavity 42 on the upstream side of check valve 39. Inlet passage 7 opens into bore 15 at one side of valve seat 43 and outlet passage 9 opens into cavity 42 at the other side of valve seat 43. Accordingly, closure of check valve 39, by engagement with valve seat 43, interrupts the flow of compressed air between control valve device 3 and brake cylinder device 2, and the opening of check valve 39, by disengagement of check valve 39 from valve seat 43, establishes this flow path.

Stepped bore 22 of spool valve 18 is closed by a sealed end plug 44 that is held in place against a shoulder 45 of stepped bore 22 by a snap ring.

Formed in bore 17 between this closed end of spool valve 18 and balance piston 38 is a balancing chamber 46 in which is disposed a proportioning spring 47 that acts between the end plug and balance piston 38. A cover 48 closes cavity 42 and serves as a stop against which the disc valve element of check valve 39 rests in its open position.

Spool valve 18 is connected to actuating piston 26 through a lost-motion connection therebetween. This lost-motion connection is provided by a connecting stem 49 that is fixed to actuating piston 26 at its one end and is formed with a head 50 at its other end that projects into stepped bore 22.

Head 50 of connecting stem 49 is axially spaced-apart from a shoulder 51 of stepped bore 22 when the actuating piston 26 is in contact with its limit stop 36 in the retracted position of sensor arm 34, and spool valve member 18 is in its rightward-most position, as shown. This distance between head 50 and shoulder 51 corresponds to the distance adjusting screw 37 of sensor arm 34 is retracted from the railway car side frame when the car is in a full load condition of car weight, as represented by line X. Thus, stem 49 of actuating piston 26 is free to move leftward from its shown position without imparting movement of spool valve 18 until the sensor arm 34 rotates through a range of travel sufficient to establish engagement with a fully loaded car side frame. In this manner, sensor arm 34 can be fully retracted to its shown position without requiring corresponding travel of spool valve member 18, so that the main body 6 housing the spool valve member 18 and bushing 16 can be limited in size.

In the shown position of spool valve member 18, a passage 52 has its ports in bushing 16 terminating at bore 17 on opposite sides of spool valve 18 to communicate actuating chamber 28 and balancing chamber 46. Also in this shown position, head 50 of connecting stem 49 is spaced-apart from a stem 53 that projects from one side of end plug 44 into stepped bore 22. Another stem 54 that projects from the opposite side of end plug 44 into the balancing chamber 46 is adapted to engage balance piston 38 of the proportioning valve 41 to unseat check valve 39 from seat 43. In order to locate and maintain spool valve 18 in its rightward-most position shown until such time as the actuating piston 26 pulls spool valve 18 leftwardly through its lost-motion connection therewith, a positioning spring 55 is provided between actuating piston 26 and spool valve 18. This positioning spring 55 is stronger than proportioning spring 47 to counteract the opposing proportioning spring force acting on spool valve 18.

A release control valve device 62 is arranged in parallel with proportioning valve check valve 41. Release control valve device 62 includes a valve element 63 that is biased toward engagement with a valve seat 64 by a spring 65. A passage 7b in body 6 connects the area of cavity 42 within the periphery of check valve seat 43 to the area of a cavity 66 outside the periphery of the release control valve seat 64. Another passage 9a in body 6 connects the area of cavity 42 outside the periphery of check valve seat 43 to an area of cavity 66 within the periphery of release control valve seat 64.

BRAKE APPLICATION ON LOADED CAR

When a brake application is made by reducing the brake pipe pressure in a well-known manner, control valve device 3 connects air from the auxiliary reservoir 5 to brake cylinder supply pipe 8. The air supplied to pipe 8 is connected directly to brake cylinder 2 via inlet passage 7, open check valve 39, outlet passage 9 and pipe 10, and also to actuating chamber 28 via inlet passage 7 and branch passage 7a.

In the rightward-most position in which spool valve 18 is normally maintained by positioning spring 55, the air admitted to actuating chamber 28 is connected to balancing chamber 46 via passage 52 to balance the brake cylinder air pressure acting on the opposite side of balance piston 38. The opposing equal pressure areas of check valve 39 are also subject to the brake cylinder pressure effective in cavity 42. Accordingly, proportioning valve 41 is force-balanced by the effective air loading, but is biased by proportioning spring 47 to maintain check valve 39 open. Consequently, the proportioning valve 41 is conditioned to operate in its non-proportioning mode, i.e., without reducing the pressure supplied to brake cylinder 2 via pipe 8.

As the brake cylinder pressure builds up, the corresponding pressure admitted to actuating chamber 28 acts on actuating piston 26. When the force of this pressure overcomes the opposing force of retraction spring 35, the sensor arm 34 is forced by push rod 32 to rotate about its pivot connection with extension 33 of end body 27 until adjusting screw 37 encounters the car side frame.

As long as the car weight is in the load range, such that the position of the car side frame relative to the car body is between the full load and changeover points represented by lines X and Z, connecting stem 49 will move with actuating piston 26 only sufficiently to allow head 50 to pick up shoulder 51 and pull spool valve 18 in a leftward direction a limited distance corresponding to the degree of rotation of sensor arm 34. This limited distance spool valve 18 moves is within its load range of travel, wherein O-ring 24 remains positioned on the right-hand side of the port of passage 52 via which balancing chamber 46 continues to be pressurized. Also, equalizing reservoir 13 is vented via passage 11, spool groove 19 and vent passage 14. Although proportioning spring 47 becomes increasingly relaxed with this leftward movement of spool valve 18, sufficient force is still provided to maintain check valve 39 in its open position through the entire load range of travel of spool valve 18. Brake cylinder pressure thus corresponds to the pressure supplied to pipe 8 via control valve device 3.

Figure 2:
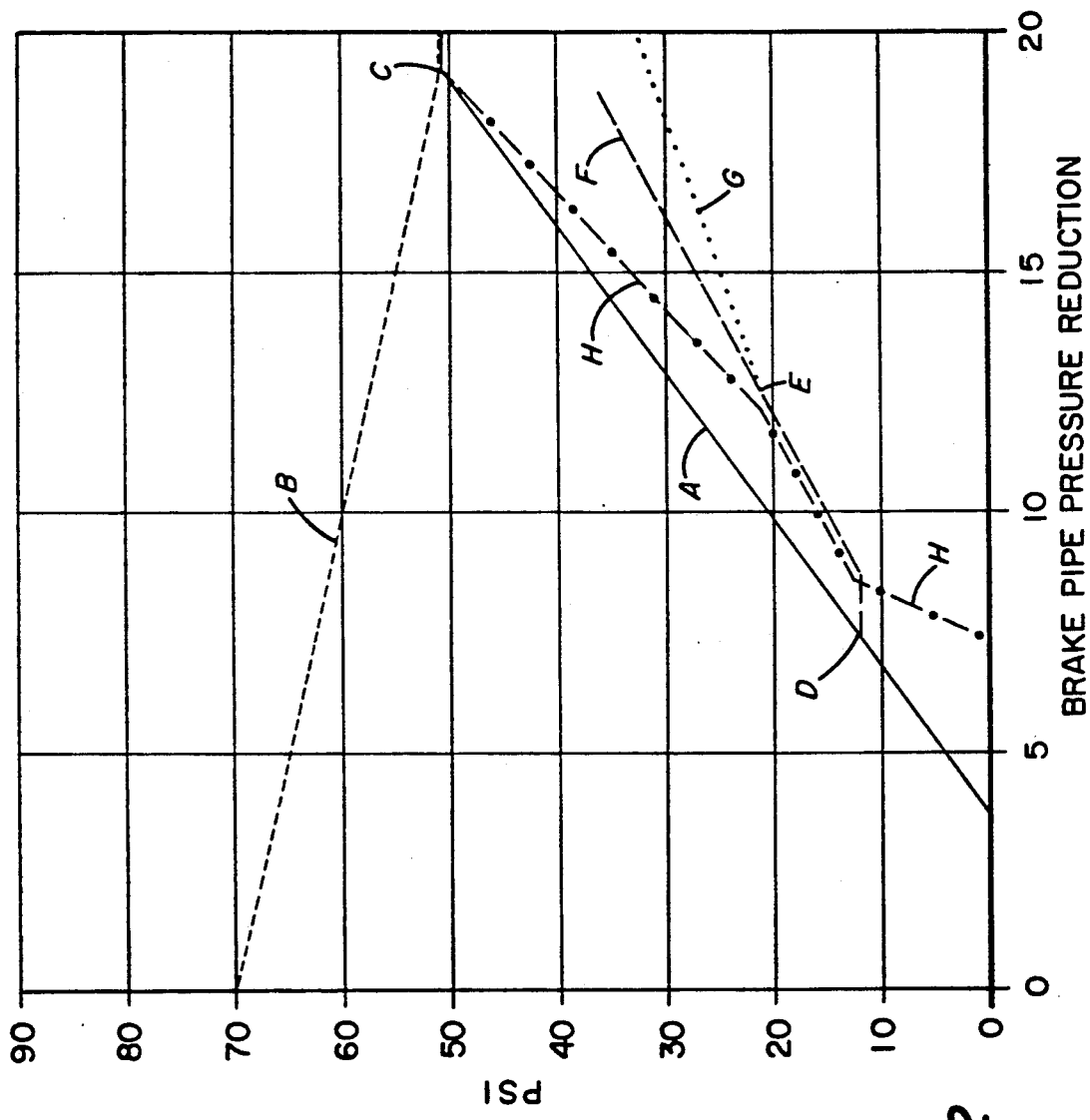
FIG. 2 is a graph showing the empty and load controlled buildup of brake pressures when a variable output proportioning spring is employed, as shown in the embodiment of FIG. 1.

In the graph of FIG. 2, this direct or non-proportioned supply of brake cylinder pressure is represented by solid line A, which can be seen to increase as the brake pipe pressure represented by solid line B decreases, until at point C, pressure equalization occurs.

BRAKE RELEASE ON LOADED CAR

When a brake release is desired, brake pipe pressure is increased in a well-known manner to cause control valve device 3 to vent supply pipe 8. With check valve 39 being maintained in its open position, as explained, the air in brake cylinder 2 is released via outlet passage 9, open check valve 39, inlet passage 7, and the vented supply pipe 8.

BRAKE APPLICATION ON EMPTY CAR

Referring to FIG. 1, when the load sensor arm 34 is able to rotate sufficiently that adjusting screw 37 is deflected beyond the empty/load changeover point represented by line Z before encountering the car side frame, the car weight is indicated as being in the empty range of car loading. Actuating piston 26 consequently pulls spool valve 18 further leftward into its empty range of travel in which O-ring 24 cuts off registry of passage 52 with actuating chamber 28, and spool groove 19 establishes registry between passages 52 and 14. The air supplied to balancing chamber 46 is thus interrupted and balancing chamber 46 is concurrently vented via passage 52, spool groove 19, and vent passage 14, thereby de-pressurizing balancing chamber 46. This results in an unbalanced air load across balance piston 38 in the direction of closure of check valve 39 to establish the proportioning mode of operation of proportioning valve 41.

At the same time, spool groove 20 is registered with passage 11 to connect air from supply pipe 8 to equalizing reservoir 13 via inlet passage 7, branch passage 7a, actuating chamber 28, opening 30 and stepped bore 22, connecting port 21, spool groove 20, passage 11 and pipe 12. This supply of air from pipe 8 to equalizing reservoir 13 occurs in parallel with the supply of air to brake cylinder 2 via proportioning valve 41. Although proportioning valve 41 is conditioned to operate in a proportional mode, as explained, until the brake cylinder pressure effective in cavity 42 is sufficient to overcome the force of proportioning spring 47, check valve 39 will continue to be held open and no proportioning of the brake cylinder pressure will yet occur. However, the brake cylinder pressure will be somewhat modulated by virtue of the volumetric expansion of auxiliary reservoir 5 with equalizing reservoir 13. This modulated phase of brake cylinder buildup pressure thus depends upon the volume of equalizing reservoir 13, which, in turn, is selected so that following a proportioned full service brake application, the interconnected equalizing reservoir and auxiliary reservoir pressures will be substantially the same as the brake pipe pressure, as represented at point C in the graph of FIG. 2. From an initial charge of 70 psi., this equalization will occur between approximately 48 psi. and 52 psi.

As can also be seen from the graph of FIG. 2, the point D, at which the direct buildup of brake cylinder pressure effective in actuating chamber 28 is sufficient to cause the actuating piston 26 to overcome the force of retracting spring 35, corresponds to approximately 12 psi. Until the brake cylinder pressure builds up to approximately 20 psi., however, the differential force on balance piston 38 is insufficient to overcome the force of proportioning spring 47. Consequently, the modulated phase of brake cylinder pressure buildup occurs between points D and E, as represented by dashed line F, due to equalizing reservoir 13 being pressurized in parallel with brake cylinder 2. At point E, the modulated brake cylinder pressure effective in cavity 42 builds up sufficiently to cause proportioning valve 41 to move against proportioning spring 47 and thereby effect closure of check valve 39. This initiates a proportioning phase of the brake cylinder pressure buildup, as represented by dotted line G in the graph of FIG. 2.

During this proportioning phase of the brake pressure buildup, the supply of air to brake cylinder 2 via supply pipe 8 is reduced by the action of proportioning valve 41 according to the differential air load across balance piston 38 and check valve 39 offset by the force exerted by proportioning spring 47 according to the particular car load condition that might exist. It should be noted at this point that in the closed position of check valve 39, a differential pressure area is subject to the air in supply pipe 8, as determined by the difference in diameter between balancing piston 38 and the diameter of check valve 39 within the area defined by valve seat 43. In this manner, a rightward acting force differential is exerted on proportioning valve 41 to effect opening of check valve 39 in response to a further increase of brake cylinder supply pressure when it is desired to increase a partial brake application.

The following table is a tabulation of a range of input pressures $P_i$ and the corresponding output pressures $P_o$ resulting from operation of proportioning valve 41 under different vehicle load conditions in the empty/load range, as represented by the different effective forces S of proportioning spring 47.

| | $P_o$ | | | |
|---|---|---|---|---|
| $P_i$ | S = 6.136 | S = 8.0 | S = 10.0 | S = 11.3 |
| 20 | 20 | — | — | — |
| 26 | 22 | 26 | — | — |
| 32.6 | 24.6 | 28.2 | 32.6 | — |
| 36.83 | 25.6 | 29.7 | 34.0 | 36.8 |
| 50.4 | 30.13 | | | |
| 49.52 | | 33.84 | | |
| 48.6 | | | 37.9 | |
| 48.0 | | | | 40.6 |

The foregoing pressures $P_i/P_o$ may be calculated from the following balance equation for proportioning valve 41:

$$(A_2 - A_1) P_i + S = A_2 P_o \tag{1}$$

where $P_i$ = brake cylinder supply pressure at passage (7)
$P_o$ = brake cylinder delivery pressure at passage (9)
$A_1$ = area of balance piston (38) subject to pressure $P_i$
$A_2$ = area of valve seat (43)
$S$ = force of spring (47)

letting $A_1$ = 0.3068 sq. in., and
$A_2$ = 0.4602 sq. in.

equation (1) becomes:

$$0.1534 P_i + S = 0.4602 P_o \tag{2}$$

solving for $P_o$, equation (2) becomes:

$$P_o = \frac{P_i + 6.519 S}{3} \quad (3)$$

The slope of line G in the graph of FIG. 2 represents the proportioned brake cylinder pressure as a percentage of the modulated brake cylinder supply pressure effective at inlet passage 7 and represented by dashed line F. Dash-dot line H in the graph of FIG. 2 represents the pressure in equalizing reservoir 13.

Figure 3:
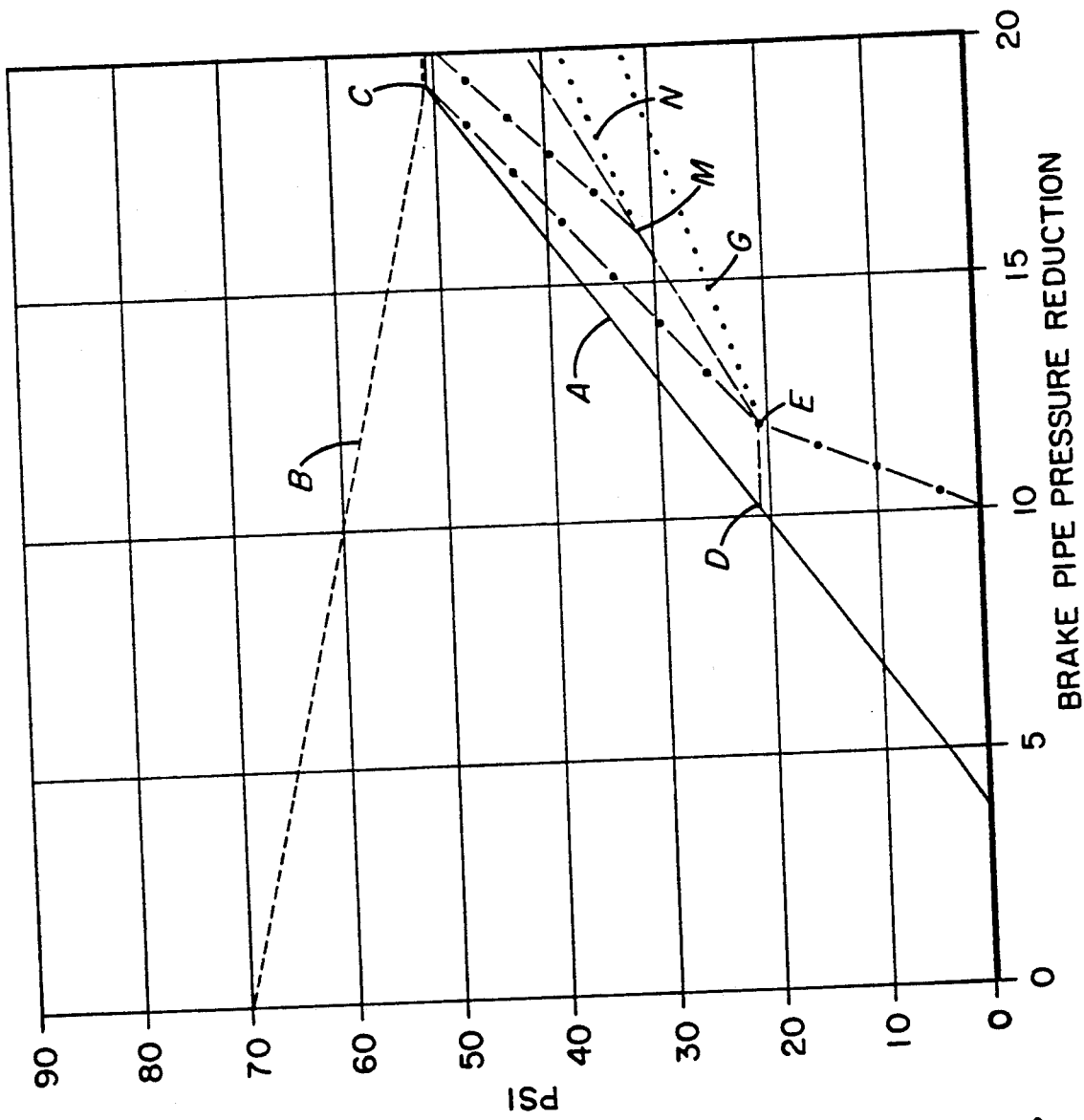
FIG. 3 is a graph showing the empty and load controlled buildup of brake pressures when the load sensing and empty car proportioning functions occur concurrently.

Shifting of spool valve 18 into its empty range of travel can be made to occur concurrently with closure of proportioning valve 41 by selecting retracting spring 35 to resist operation of actuating piston 26 until the pressure in actuating chamber 28 reaches the pressure at which proportioning valve 41 is closed against the force of proportioning spring 47. This is illustrated in the graph of FIG. 3 where it can be seen that point D and point E occur at the same pressure (20 psi.)

Being located on the upstream side of brake cylinder device 2, it will be appreciated that check valve 39 will prevent any backflow of air from brake cylinder 2 when equalizing reservoir 13 is initially connected to inlet passage 7 in response to actuating piston 26 pulling spool valve 18 into its empty range of travel, as indicated at point D in the graph of FIG. 2. Also, spring 65 of release control valve 62 is sufficiently strong to maintain valve element 63 seated against the maximum opening force capable of being developed across valve element 63 due to the differential pressure between passages 7, 7b and 9, 9a during this initial movement of spool valve 18 into its empty range. This prevents any drop in the effective brake cylinder pressure while the equalizing reservoir pressure is building up to the effective brake cylinder pressure. Should the pressure at inlet passage 7 tend to drop when equalizing reservoir 13 is cut in, the resultant pressure reversal will effect closure of check valve 39 and valve element 63 of release valve device 62 will remain seated under the force of spring 65 to thereby isolate brake cylinder 2 from equalizing reservoir 13.

Proportioning spring 47 exerts a variable force on proportioning valve 41 depending upon the actual position of spool valve 18 in its empty range of travel, as determined by the degree of sensor arm rotation required before adjusting screw 37 encounters the car side frame. If, for example, the adjusting screw 37 encounters the car side frame just beyond the changeover point in the empty range of car weight, the degree of compression of proportioning spring 47 will approach a maximum due to minimal leftward movement of spool valve 18 into the empty range of travel. On the other hand, if the car weight is such that the adjusting screw 37 fails to encounter the car side frame until it is at the other end of the empty range, the degree of compression of proportioning spring 47 will be substantially reduced, due to further leftward movement of spool valve 18 into the empty range of travel. The force exerted on proportioning valve 41 by proportioning spring 47 will thus vary with the degree of spring compression, such that the proportioned brake cylinder pressure will be greater for heavier car weights than for lighter car weights within the empty car brake range. This is due to the fact that the greater spring force withholds operation of proportioning valve 41 until a higher brake cylinder pressure is developed before the proportioning phase of the brake cylinder pressure buildup commences. In the graph of FIG. 3, for example, point M represents the pressure at which proportioning valve operation commences under the influence of a proportioning spring that reflects a car weight in the higher end of the empty range; whereas point E represents the pressure at which proportioning valve operation commences in accordance with compression of proportioning spring 47 corresponding to a car weight in the lower end of the empty range of car loading. It can be seen that the proportioned brake cylinder pressure on the empty car having the heavier load weight, as represented by line N, is greater than the proportioned brake cylinder pressure on a lighter empty car, as represented by line G.

In accordance with the foregoing, the effect of proportioning spring 47 should now be clear in terms of achieving different levels of proportional brake cylinder pressure for a given brake application, depending upon the actual weight of a railway car that is conditioned for empty car braking.

In providing a double O-ring seal 23 and O-ring seal 24 on opposite sides of spool valve groove 19, as well as an O-ring seal 60 on balancing piston 38, changeover valve device is prevented from transitioning between its empty and load setting due to car body rock and roll. The distance between the pair of O-rings 24, and the distance between the port of passage 52 and O-ring 23 provides a deadband zone within which spool valve 18 can move between its empty and load ranges of travel due to car rock and roll without changing the existing load setting. Adjusting screw 37 is set so that at the selected changeover point Z of sensor arm 34, spool valve 18 is located in a neutral position within the deadband zone by engagement of head 50 of connecting stem 49 with shoulder 51. In this deadband zone, O-rings 23 are located o opposite sides of the bushing port of passage 11 and O-ring 24 is located on the right-hand side of the bushing port of passage 52. When spool valve 18 is shifted from its load range into the deadband zone, the O-ring 24 continues to cut off venting of balance chamber 46 via spool groove 19 and vent passage 14. Concurrently, O-ring 23 on the left-hand side of the port of passage 11 cuts off venting of equalizing reservoir 13 via spool groove 19 and vent passage 14, but O-ring 23 on the right-hand side of the port of passage 11 continues to cut off pressurization of equalizing reservoir 13. It will be appreciated, therefore, that the spool valve porting necessary to establish the empty setting of changeover valve device 1, as previously explained, can only be achieved by spool valve movement through the deadband zone, as determined by the right-hand O-ring of O-ring seal 23, and the O-ring 24 crossing the respective ports of passages 11 and 52. The deadband range of spool valve travel is such as to accommodate typical rock and roll undulations of a railway car.

When the spool valve 18 is within its empty range, balance chamber 46 is vented via passage 52, spool groove 19, and vent passage 14 to condition proportioning valve 41 for the previously explained proportioning phase of operation, which occurs in response to brake cylinder pressure reaching a value sufficient to effect closure of proportioning valve check valve 39. When this occurs, balance piston 38 is shifted leftwardly until check valve element 39 engages seat 43, in which position O-ring 60 crosses the port of passage 52 leading to balancing chamber 46. In this manner, O-ring 60 provides a lock-out feature which isolates chamber 46 from pressure that might inadvertently be supplied to passage 52, in the event car rock and roll should cause spool valve 18 to move rightwardly enough to allow air in chamber 28 to enter passage 52 past O-ring 24. Thus, balancing chamber 46 is prevented from being alternately pressurized and depressurized with the rock and roll undulations of the car due to this lock-out feature provided by O-ring 60.

BRAKE RELEASE ON EMPTY CAR

When a brake release is desired, brake pipe pressure is increased in a well-known manner to cause control valve device 3 to vent supply pipe 8. Consequently, the air under check valve 39 within the area of valve seat 43 on which check valve 39 is seated, is vented with the air in supply pipe 8. While this tends to reinforce the closure force on check valve 39, the air in cavity 66 outside the periphery of the release control check valve seat 64 is also vented via passages 7b and 7 leading to pipe 8. When a differential pressure between passages 7, 7b and 9, 9a develops sufficient to overcome the bias force of spring 65, the release control check valve 63 is unseated to allow the pressure in brake cylinder device 2 to be released at the car control valve via pipe 10, the area of cavity 42 outside valve seat 43, passage 9a, open check valve 63 of release control valve 62, passages 7b and 7, and pipe 8.

As brake cylinder pressure is thus released in the manner explained, in bypass of seated check valve 39, actuating chamber 28 is also being vented via pipe 8, allowing retracting spring 35 to eventually move actuating piston 26 toward its stop 36. Prior to actuating piston 26 engaging stop 36, however, head 50 of connecting stem 49 engages stem 53 of spool valve end plug 44 and moves spool valve 18 with it in a rightward direction. Stem 54 of end plug 44, in turn, engages balancing piston 38 to force check valve 39 off its seat 43 against the check valve closure force. This unseating of check valve 39 allows the differential pressure across check valve 39 to equalize, whereby proportioning spring 47 is effective to force balance piston 38 and check valve 39 into engagement with cover 48 and, accordingly, maintain proportioning valve 41 in its open position. The remaining air in brake cylinder 2 is accordingly released via pipe 10, unseated check valve 39, inlet passage 7, pipe 8, and control valve 3, in parallel with the air being released via release control valve 62 until the differential pressure between passages 9, 9a and 7, 7b is insufficient to overcome the force of bias spring 65. When this occurs, release control check valve 63 becomes seated and the final air remaining in brake cylinder device 2 is vented via open check valve 39.

Concurrently with opening of check valve 39, as explained, spool valve 18 is shifted to its rightward-most position in which O-ring 60 is positioned on the righthand side of the port of passage 52 that leads to balancing chamber 46. In this manner, balancing chamber 46 is re-pressurized to establish the direct or non-proportioning mode of operation of proportioning valve 41, and equalizing reservoir 13 is vented preparatory to a subsequent brake application.

We claim:

1. A changeover valve device interposed between a control valve and a vehicle brake cylinder for adjusting the brake cylinder pressure according to the vehicle load condition comprising:
   (a) load sensing means for providing a load setting of said changeover valve device when the load of said vehicle exceeds a predetermined value and for providing an empty setting of said changeover valve when the load of said vehicle is less than said predetermined value;
   (b) an inlet passage connected to said control valve and an outlet passage connected to said brake cylinder;
   (c) proportioning valve means including:
      (i) a first valve seat between said inlet and outlet passages;
      (ii) a first valve element between said first valve seat and said outlet passage, said first valve element being engageable with said first valve seat in a closed position to interrupt fluid pressure communication between said inlet and outlet passages and disengageable therefrom in an open position to establish fluid pressure communication between said inlet and outlet passages; and
      (iii) a balance piston to which said first valve element is connected having equal opposing pressure areas, one of said pressure areas being subject to the fluid under pressure effective at said inlet passage;
   (d) empty/load valve means for supplying the fluid under pressure at said inlet passage to the other of said pressure areas of said balance piston in said load setting of said changeover valve device to establish a force balance across said piston member, and for venting fluid under pressure acting on said other pressure area in said empty setting of said changeover valve device to establish a differential force across said balance piston in the direction of engagement of said first valve element with said first valve seat; and
   (e) lock-out means for interrupting said supply and venting of fluid under pressure effective at said other pressure area of said balance piston when said differential force across said balance piston is sufficient to cause said balance piston to effect said engagement of said first valve element with said first valve seat.

2. A changeover valve device, as recited in claim 1, further comprising release control valve means for establishing fluid pressure communication between said inlet and outlet passages in bypass of said proportioning valve means when the fluid under pressure is released from said inlet passage.

3. An empty/load changeover valve device, as recited in claim 2, wherein said release control valve means comprises:
   (a) a first branch passage connected to said inlet passage;
   (b) a second branch passage connected to said outlet passage;
   (c) a second valve seat in said second branch passage; and
   (d) a second valve element engageable with said second valve seat in response to the fluid under pressure at said inlet passage being greater than the fluid under pressure at said outlet passage, and disengageable from said second valve seat in response to the fluid under pressure at said outlet passage being greater than the fluid under pressure at said inlet passage due to said release of fluid under pressure from said inlet passage.

4. An empty/load changeover valve device, as recited in claim 2, wherein said release control valve means further comprises bias means for urging said second valve element toward said engagement with said second valve seat.

5. An empty/load changeover valve device, as recited in claim 1, further comprising:
   (a) said empty/load valve means being engageable with said balance piston for maintaining said first valve element disengaged from said first valve seat;
   (b) said load sensing means comprising:
      (i) a sensing arm;
      (ii) a fluid pressure operated piston abutment connected to said sensing arm and subject to fluid under pressure effective at said inlet passage to effect operation of said sensing arm; and
      (iii) means for connecting said piston abutment to said empty/load valve means; and
   (c) retracting spring means for urging said piston abutment toward a retracted position in which said empty/load valve means is engageable with said balance piston to effect said disengagement of said first valve element from said first valve seat.

6. An empty/load changeover valve device, as recited in claim 5, further comprising:
   (a) an actuating chamber in which said piston abutment is operably disposed;
   (b) a branch passage between said inlet passage and said actuating chamber;
   (c) a main bore opening into said actuating chamber;
   (d) said empty/load valve means including a spool valve member operably disposed in said main bore and having a first range of travel in said load setting of said changeover valve device and a second range of travel in said empty setting of said changeover valve device;
   (e) said balance piston being operably disposed in said main bore adjacent said spool valve member;
   (f) a balancing chamber in said main bore between said spool valve member and said other pressure area of said balance piston;
   (g) first, second, and third ports opening into said main bore;
   (h) a vent passage connecting said second port to atmosphere;
   (i) a common passage interconnecting said first and third ports;
   (j) a first annular groove surrounding the periphery of said spool valve member; and
   (k) first and second seal ring means encircling the periphery of said spool valve member on the respective opposite sides of said first annular groove so as to be aligned intermediate said first and third ports in said first range of travel of said spool valve member to establish fluid pressure registry between said actuating chamber and said balance chamber, said first and second seal ring means in said second range of travel being aligned axially on the respective opposite sides of said first and second ports to cut off said fluid pressure registry between said actuating chamber and said balance chamber and to establish fluid pressure registry between said balance chamber and atmosphere; and
   (l) said lock-out means comprising third seal ring means encircling the periphery of said balance piston such as to be aligned on one side of said third port when said first valve element is disengaged from said first valve seat and aligned on the other side of said third port when said first valve element is engaged with said first valve seat.

7. An empty/load changeover valve device, as recited in claim 6, further comprising:
   (a) an equalizing reservoir;
   (b) a fourth port opening into said main bore;
   (c) an equalizing passage between said fourth port and said equalizing reservoir;
   (d) a second annular groove surrounding the periphery of said spool valve member adjacent said second seal ring means on the side thereof opposite said first annular groove;
   (e) a bore in said spool valve opening into said actuating chamber;
   (f) a connecting passage between said bore in said spool valve and said second annular groove; and
   (g) fourth seal ring means encircling the periphery of said spool valve member on the side of said second annular groove opposite said second seal ring means, said first and second seal ring means in said first range of travel being axially aligned on the respective opposite sides of said second and fourth ports to establish fluid pressure registry between said equalizing reservoir and atmosphere, said second seal ring means in said second range of travel of said spool valve member being axially aligned intermediate said second and fourth ports to cut off said fluid pressure registry between said equalizing reservoir and atmosphere and to establish fluid pressure registry between said bore in said spool valve and said equalizing reservoir.

8. An empty/load changeover valve device, as recited in claim 7, wherein said second seal ring means comprises a pair of axially-spaced annular seal rings, each axially aligned relative to said fourth port so as to lie on an opposite side thereof when said spool valve member is in a deadband zone between said first and second ranges of travel thereof.

9. An empty/load changeover valve device, as recited in claim 8, wherein the axial dimension of said deadband zone corresponds to the distance between said pair of axially-spaced annular seal rings comprising respective ones of said second seal ring means.

10. An empty/load changeover valve device, as recited in claim 3, wherein said vehicle has a sprung and an unsprung portion on one of which is mounted said changeover valve device, said sensing arm being engageable with the other of said sprung and unsprung portions, the distance therebetween being a measure of the vehicle load.

11. An empty/load changeover valve device, as recited in claim 10, further comprising spring means for exerting a force on said balance piston urging said first valve element toward said open position thereof, said force varying in accordance with said distance measured by said sensing means in said empty setting of said changeover valve device.

* * * * *